C. R. SCOTT.
TRANSMISSION GEARING.
APPLICATION FILED FEB. 23, 1916.
1,183,322.
Patented May 16, 1916.
4 SHEETS—SHEET 4.
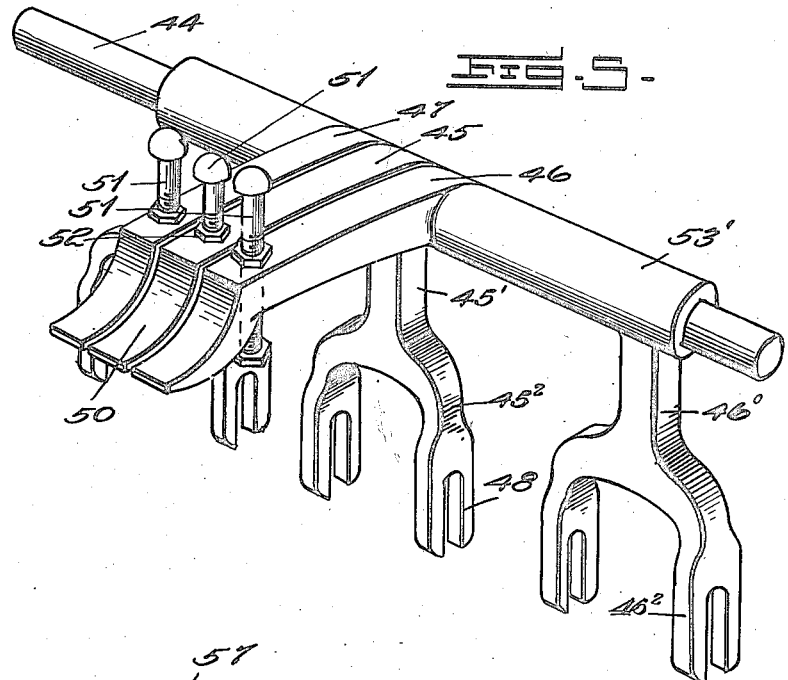
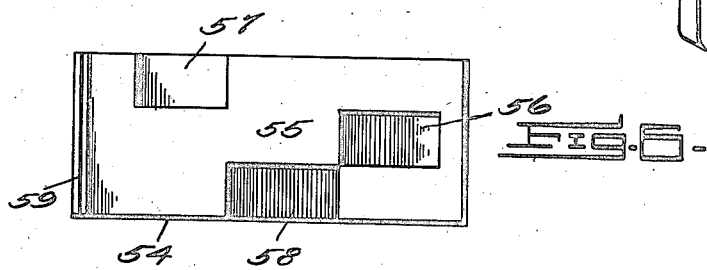
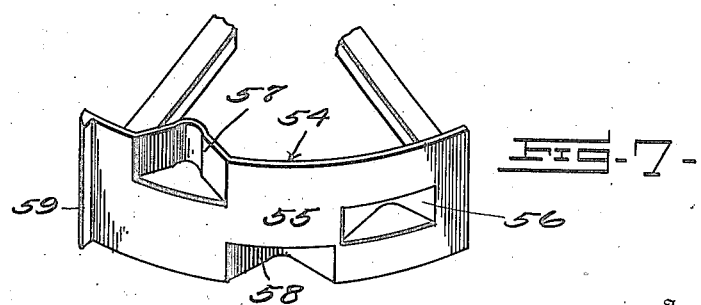
Inventor
Charles R. Scott,
Witnesses
By
Attorney

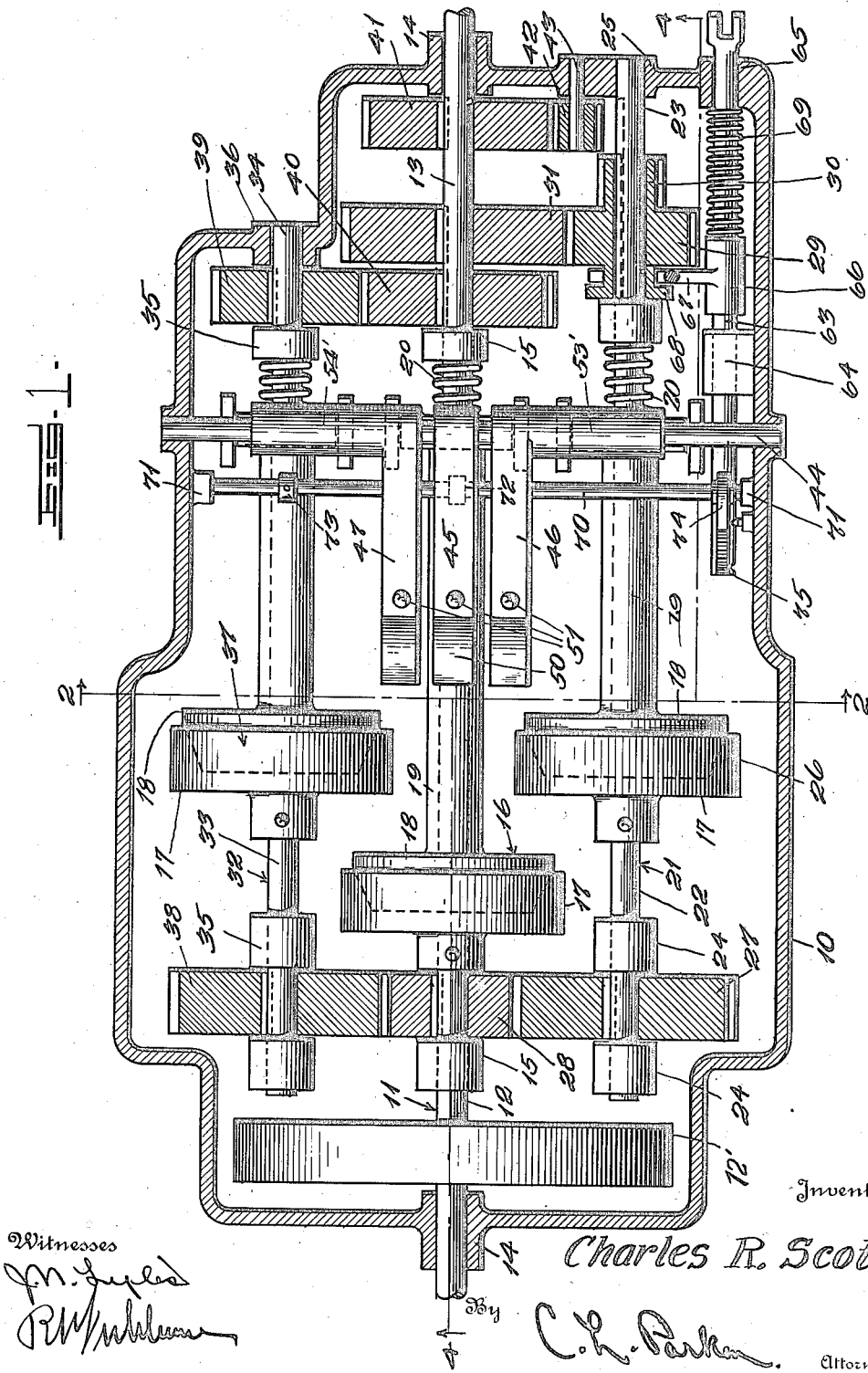

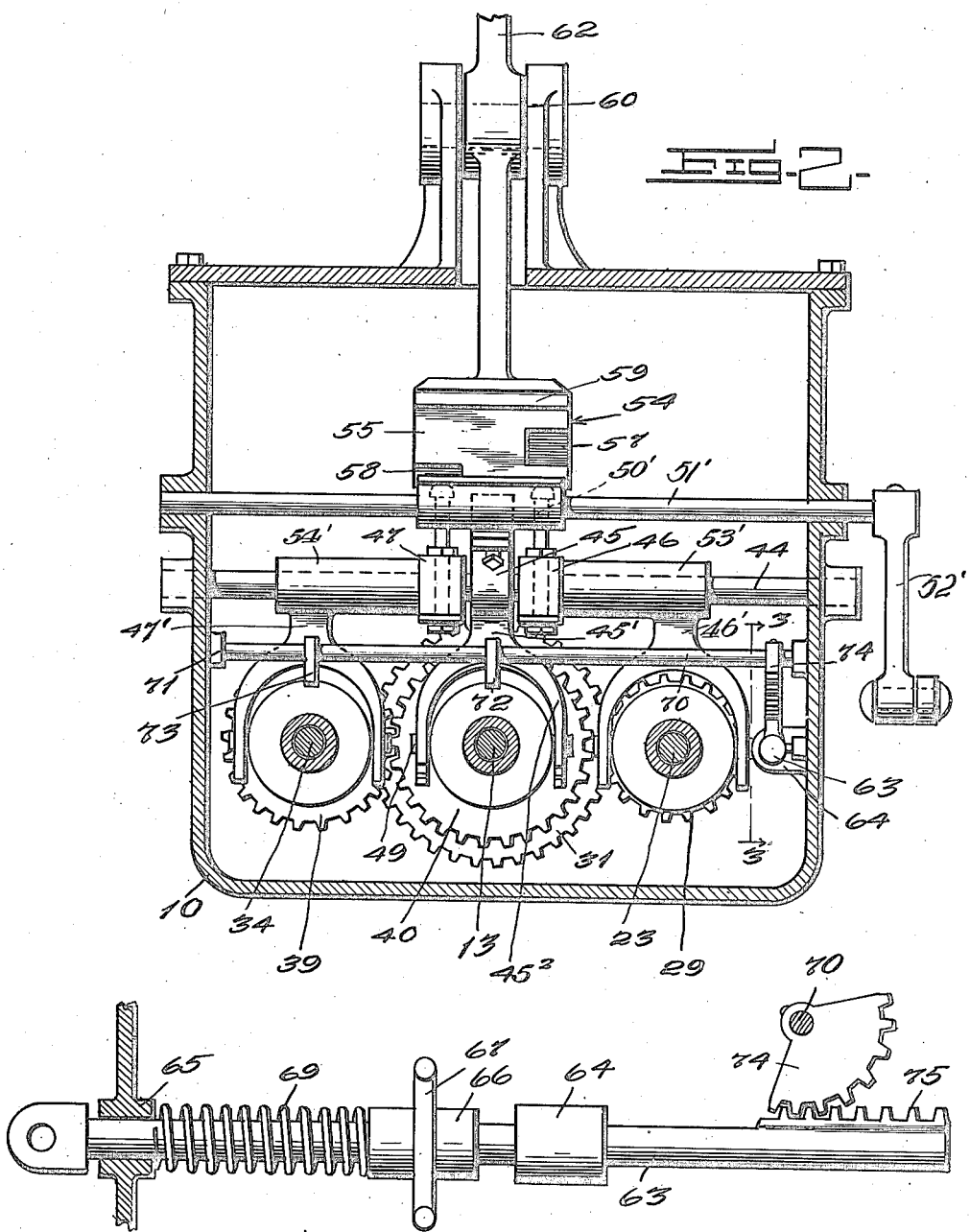

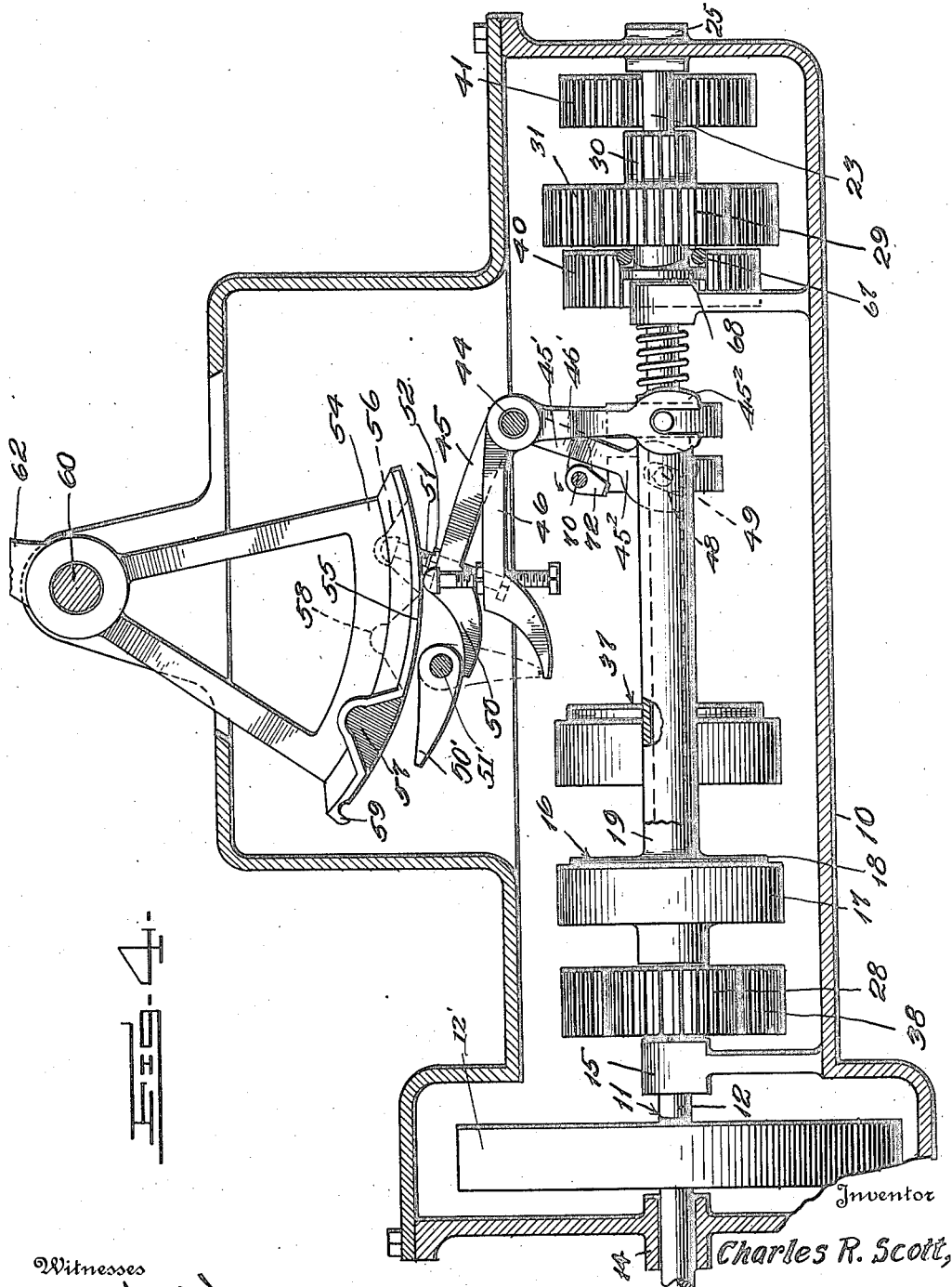

UNITED STATES PATENT OFFICE.

CHARLES R. SCOTT, OF WYANDOTTE, OKLAHOMA.

TRANSMISSION-GEARING.

1,183,322.	Specification of Letters Patent.	Patented May 16, 1916.

Application filed February 23, 1916. Serial No. 79,951.

*To all whom it may concern:*

Be it known that I, CHARLES R. SCOTT, a citizen of the United States, residing at Wyandotte, in the county of Ottawa and State of Oklahoma, have invented certain new and useful Improvements in Transmission-Gearing, of which the following is a specification.

My invention relates to improvements in speed changing transmission gearing, for use upon automobiles or light vehicles.

An important object of the invention is to provide means of the above mentioned character, so constructed that the gearing may be shifted into different speeds, and reverse, in a highly convenient manner, without liability of the gears being stripped.

A further object of the invention is to provide simple and reliable shifting means, for rendering the speed changing elements of the gearing active and inactive.

Other objects and advantages of the invention will be apparent during the course of the following description.

In the accompanying drawings forming a part of this specification and in which like numerals are employed to designate like parts throughout the same, Figure 1 is a plan view of gearing embodying my invention, portions thereof being shown in section, Fig. 2 is a transverse vertical sectional view taken on line 2—2 of Fig. 1, Fig. 3 is a longitudinal sectional view taken on line 3—3 of Fig. 2, Fig. 4 is a vertical longitudinal sectional view taken on line 4—4 of Fig. 1, Fig. 5 is a perspective view of gear shifting forks or elements, together with associated elements, Fig. 6 is a bottom plan view of a controlling heel or member carried by the manually operated lever, and, Fig. 7 is a perspective view of the same looking at the bottom thereof, with the upper portion of the same broken away.

In the drawings, wherein for the purpose of illustration is shown a preferred embodiment of my invention, the numeral 10 designates a gear casing. Extending longitudinally within the gear casing 10 is a forward high speed shaft designated as a whole by the numeral 11. This high speed shaft is formed in sections 12 and 13, suitably journaled within bearings 14 and 15. The shaft-section 12 is connected with the crank shaft of the engine, to be driven thereby, preferably by means of the friction disk clutch, ordinarily employed. This shaft-section carries the fly-wheel 12'. The shaft-section 13 is connected with the rear wheels of the automobile by means of differential gear (not shown), as is customary.

The shaft-sections 12 and 13 are adapted to be connected for rotation together by clutch mechanism, designated as a whole by the numeral 16. This clutch mechanism may be of any well known or preferred construction. For the purpose of illustration the clutch mechanism is shown as comprising a friction clutch element 17, rigidly mounted upon the rear end of the shaft-section 12 and adapted for engagement with a co-acting friction clutch element 18, rigidly mounted upon a sleeve 19, splined upon the shaft-section 13, to move longitudinally thereof, but being incapable of turning thereon. The clutch mechanism 16 is automatically rendered active by a spring 20, engaging the rear end of the sleeve 19 and the bearing 15, as shown.

Extending parallel with the forward high speed shaft 11 is a forward low or first speed shaft 21, comprising shaft-sections 22 and 23, journaled through bearings 24 and 25, as shown. The shaft-sections 22 and 23 are adapted to be connected for rotation together by means of a clutch mechanism 26, preferably identical with the clutch mechanism 16 and therefore need not be again described in detail. Connected with the forward end of the shaft-section 22 is a large pinion or gear 27, engaging a smaller pinion or gear 28, rigidly mounted upon the shaft-section 12. Splined upon the shaft-section 23 is a smaller pinion or gear 29, having a reverse pinion or gear 30, preferably formed integral therewith. The gear 29 is adapted to normally engage with a larger gear 31, rigidly mounted upon the shaft-section 13. It is thus apparent that the rotation of the shaft-section 12 may be transmitted to the shaft-section 13 through clutch mechanism 26, shaft-section 23, pinion 29, and pinion 31, which is accordingly driven at a reduced speed in a forwardly direction.

Extending parallel with the high speed shaft 11 and arranged upon the opposite side thereof, is a forward second or intermediate speed shaft 32, formed in shaft-sections 33 and 34, which are journaled through bearings 35 and 36, as shown. The shaft-sections 33 and 34 are adapted to be connected for rotation together by means of a clutch mechanism 37, identical with the clutch mechanism 16, whereby no further detailed description thereof is thought to be necessary. Connected with the forward end of the shaft-section 33 is a large pinion or gear 38, engaging the small pinion or gear 28, as shown. Rigidly connected with the rear end of the shaft-section 34 is a small pinion or gear 39, engaging a larger pinion or gear 40, which is rigidly mounted upon the shaft-section 13, as shown. It is thus apparent that the rotation of the shaft-section 12 may be imparted through pinion 28, pinion 38, shaft-section 33, clutch mechanism 37, shaft-section 34, pinion 39, and pinion 40, to the shaft-section 13, which will be driven forwardly at a second or intermediate speed.

Rigidly mounted upon the shaft-section 13 is a large pinion or gear 41, engaged by an intermediate pinion or gear 42, rotatable upon a stub shaft 43, which is fixed to the housing 10. The intermediate pinion 42 is adapted to engage and disengage with and from the reverse pinion 30, as shown.

Arranged above the rear shaft-sections is a transverse supporting shaft 44, rigidly secured to the casing 10. Pivoted upon the shaft 44 to swing in a substantially vertical plane are levers 45, 46 and 47, preferably arranged, as shown in Figs. 1 and 5. The lever 45, as more clearly shown in Fig. 2, carries a depending crank 45', having a forked end 45². This forked end is slotted, as shown at 48, to receive trunnions 49, formed upon the rear end of the sleeve 19, of the high speed clutch mechanism. The lever 45 is provided at its forward end with a head 50, having an upper cam surface for a purpose to be described. The lever 45 is also provided with an adjustable upstanding depression element 51, which may be in the form of a bolt, operating in a screw-threaded opening in the lever 45 and carrying a lock nut 52, while this detailed construction may be varied, if desired. The lever 46 and associated elements is identical with the lever 45 and associated elements, except that the depending crank 46' thereof, is rigidly connected therewith through the medium of a sleeve 53'. The forked end of the crank 46' of the lever 46 is pivoted to the rear end of the sleeve 19 of the clutch mechanism 26, in an identical manner to that described in connection with the clutch mechanism 16. The lever 47 and associated elements are substantially identical with the lever 46 and associated elements and the forked end of its depending crank 47' is pivotally connected with the rear end of the sleeve 19 of the clutch mechanism 37, as hereinabove described. The crank 47' is secured to the lever 47 by a sleeve 54', as shown.

The numeral 54 designates a control member or foot, which is arranged directly above and in proximity to the assembled vertically swinging levers 45, 46 and 47, as more clearly shown in Figs. 1 and 4. This control member has a curved lower contact face 55 (see Figs. 6 and 7) upon which is formed substantially V-shaped upstanding recesses or cavities 56, 57 and 58, disposed in different longitudinal planes with respect to the foot and arranged one after the other, longitudinally of the foot. The recess 56 is adapted to receive the depression member 51 of the lever 45; the recess 57 is adapted to receive the depression member 51 of the lever 46; and the recess 58 is adapted to receive the depression member 51 of the lever 47, as is obvious. The foot 54 is provided at its forward end with a depending flange or stop 59, adapted to simultaneously engage with when all of the depression members 51, when they are held in the neutral position, whereby the three clutch mechanisms are simultaneously rendered inactive. Arranged above the cam faces of the heads 50 is a depression cam 50', spanning all of them, to depress any of them, when elevated, as shown in Fig. 4. This depression cam is rigidly secured upon a rock shaft 51', turned by a crank 52', which may be operated by a pedal lever or other device. The function of the cam 50' and associated elements is to control the operation of each clutch mechanism, when it is active. It is thus apparent that when the clutch mechanism in either of the units is active and the automobile is being driven, such clutch mechanism is always under the control of the operator without shifting the lever 62, to be described, and by turning the shaft 51' counterclockwise, the cam 50' will move downwardly, to contact with the member 50 and return it to the lower inactive position, as clearly shown in Fig. 4, whereby such clutch mechanism is rendered inactive.

In order that the operation of the gearing may be more readily understood, it will be stated at this point, prior to the explanation of the means for causing the transmission gearing to operate in reverse. The foot 54 is pivoted at 60, and is swung in a vertical plane by a manually operated lever 62. When this lever 62 is at neutral, it is in the forward position with the flange 59 contacting with all of the depression members 51. The foot 54 now retains all of the levers 45, 46 and 47, in the horizontal position, whereby the clutch mechanisms 16, 26, and 37 are all inactive. The rotation of the shaft-sections 12, 22, and 33 is therefore not transmitted to any of their co-acting shaft-sections, whereby the shaft-section 13 is not driven. When it is desired to shift the gearing into forward first or low speed, the lever 62 is moved rearwardly sufficiently so that the depression element 51 of the lever 46 will enter the recess 57, thus allowing the lever 46 to move upwardly, as the sleeve 19 of the clutch mechanism 26 moves forwardly under the action of the spring 20, to render this clutch mechanism 26 active. It is now apparent that the rotation of the shaft-section 12 will be transmitted to the shaft-section 13, which is driven at a forward first or low speed, as hereinabove explained. To shift the gearing to forward second, or intermediate speed, the rearward movement of the lever 62 is continued until the depression element 51 of the lever 47 enters the recess 58, the depression element 51 of the lever 46 being withdrawn from the recess 57, whereby the clutch mechanism 26 is again rendered inactive. Upon this operation of the lever 62, the lever 47 rises, whereby the clutch mechanism 37 automatically becomes active, and the shaft-section 12 will drive the shaft-section 13 at forward second speed, as hereinabove explained. When the lever 62 is moved rearwardly to the end of its travel, the depression element 51 of the lever 47 moves out of the recess 58 and the lever 47 is returned to its horizontal position and the clutch mechanism 37 again rendered inactive, while the depression element 51 of the lever 45 enters the recess 56, and the clutch mechanism 16 is rendered active. When the clutch mechanism 16 is rendered active, the shaft-sections 12 and 13 are directly connected, whereby the shaft-section 13 is driven at forward first or high speed.

The numeral 63 designates a reciprocatory rod, shown more clearly in Figs. 1 and 3, operating through guides 64, 65. This rod 63 may be moved longitudinally in one direction by any suitable means, such as a foot pedal or the like. Rigidly mounted upon the rod 63 is a sleeve 66, carrying a fork 67, operating within a grooved collar 68, rigid upon the pinion 29. A coil spring 69 surrounds the rod 63, and serves to normally retain this rod in the forward position. It is thus apparent that when the rod 63 is moved in opposition to the spring 69 the reverse pinion 30 will engage the intermediate pinion 42, while the pinion 29 will simultaneously disengage pinion 31.

Means are provided to lock portions of the forward high or first speed and forward intermediate or second speed clutch mechanisms against movement, so that these mechanisms can not be rendered active, while the gearing is operating or about to operate in reverse, comprising a rock shaft 70, extending transversely of the casing 10 and journaled within bearings 71. This rock shaft has cams 72 and 73 rigidly secured thereto and arranged near and in advance of the cranks 45' and 47', of the levers 45 and 47 respectively, but normally vertically arranged so that they do not contact with these cranks during their forward swinging movements. When these cams are swung rearwardly to assume a horizontal position, by the turning of the rock shaft 70 in the direction of its arrow, these cams will then prevent any perceptible forward swinging movement of said cranks 45' and 47', whereby the clutch mechanisms 16 and 37 are locked against being rendered active. The rock shaft 70, as more clearly shown in Fig. 3, is provided with a toothed sector or gear 74, engaging rack teeth 75, formed upon the rod 63. It is obvious that when the rod 63 is moved rearwardly to bring pinion 30 into engagement with pinion 42, the rock shaft 70 is turned in the direction of the arrow for the purpose above stated.

When it is desired to operate the gearing in reverse, the lever 62 is moved to the forward neutral position and the rod 63 is moved rearwardly, bringing the pin 30 into engagement with pinion 42, while pinion 29 disengages pinion 31. The rock shaft 70 is turned and the cams carried thereby lock the clutch mechanisms 16 and 37 against being rendered active, as above explained. The lever 62 is then shifted rearwardly to the forward low speed position, whereby the depression element 51 of the lever 46 enters the recess 57, and the clutch mechanism 26 is rendered active. When this takes place, the rotation of the shaft-section 12 is transmitted to the shaft-section 13, which is rotated at a low speed and in a reverse direction to the shaft-section 12.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In transmission gearing of the character described, a driving shaft, a driven shaft, a plurality of different speed devices to alternately transmit rotation from the driving shaft to the driven shaft, pivoted levers to control the operation of the devices and carrying depression elements, a pivoted foot arranged near and above the depression elements of the levers and having recesses to receive the depression elements, and separate means to move each lever to the inactive position.

2. In transmission gearing of the character described, a driving shaft, a driven shaft, a plurality of different speed devices to alternately transmit rotation from the driving shaft to the driven shaft, movable members to control the operation of the devices and carrying extensions, a movable foot arranged near the extensions of the movable members and having recesses to receive the extensions, and means to move the foot.

3. In transmission gearing of the character described, a driving shaft, a driven shaft, a plurality of different speed devices to alternately transmit rotation from the driving shaft to the driven shaft, pivoted levers connected with the devices to control the operation thereof and carrying depression elements and having heads, a pivoted shoe arranged near and above the pivoted levers and having recesses to receive the depression elements, and an independently operated pivoted cam arranged near the heads of the levers to engage therewith, to return each lever to the normal inactive position.

4. In transmission gearing of the character described, a driving shaft, a driven shaft, a plurality of different speed devices embodying self-acting clutch mechanisms to alternately transmit rotation from the driving shaft to the driven shaft, pivoted levers connected with the clutch mechanisms to control their operation and carrying lateral extensions, a foot arranged upon corresponding sides of the levers and having recesses to receive the extensions in proper order, and means to move the foot.

5. In transmission gearing of the character described, a driving shaft, a driven shaft, a plurality of different speed devices embodying self-acting clutch mechanisms to alternately transmit rotation from the driving shaft to the driven shaft, movable members to control the operation of the clutch mechanisms, a foot arranged upon corresponding sides of the members and having means to control their movement, means to disconnect one speed device from the driven shaft and subsequently connect it therewith to rotate the driven shaft in reverse direction, and means to lock the clutch mechanisms of the remaining devices against being rendered active upon the operation of the connecting means.

6. In transmission gearing of the character described, a high speed shaft comprising separate shaft-sections, self-acting clutch mechanism to connect the shaft-sections, a different speed shaft comprising separate shaft-sections, self-acting clutch mechanism for connecting the shaft-sections of the different speed shafts, driving connecting means between corresponding shaft-sections of the two shafts, forward speed gearing connecting the opposite corresponding shaft-sections of the two shafts, reverse speed gearing for connecting the last named shaft-sections, means for controlling the operation of the clutch mechanisms, and means to automatically lock the clutch mechanism of the high speed shaft against being rendered active when the reverse speed gearing is rendered active.

7. In transmission gearing of the character described, a high speed shaft comprising forward and rear shaft-sections, self-acting clutch mechanism to connect the shaft-sections, a lower speed shaft comprising forward and rear shaft-sections, self-acting clutch mechanism for connecting the last named shaft-sections, speed reducing gearing connecting the forward shaft-sections, a gear rigidly mounted upon the rear shaft-section of the high speed shaft, a second gear rigidly mounted upon the rear shaft-section of the high speed shaft, an intermediate gear engaging the second named gear, a forward speed gear splined upon the rear shaft-section of the lower speed shaft and adapted to engage and disengage the first named gear, a reverse speed gear splined upon the rear shaft-section of the lower speed shaft, means to shift the forward gear and the reverse gear, pivoted levers connected with the clutch mechanisms to control their operation, a cam arranged near one pivoted lever to control its movement in one direction, and means operated by the movement of the shifting means to move the cam to the active and inactive position.

8. In transmission gearing of the character described, a forward high speed shaft comprising driving and driven shaft-sections, clutch mechanism for connecting the shaft-sections, a different speed shaft comprising driving and driven shaft-sections, a clutch mechanism for connecting the second named driving and driven shaft-sections, and gears connecting the driven shaft-sections in such a manner that one driven shaft-section is adapted to transmit two speeds to the other driven shaft-section.

9. In transmission gearing of the character described, a main shaft comprising forward and rear shaft-sections, clutch mechanism for connecting the driving and driven shaft-sections, a second shaft adapted to be driven at a different speed and comprising driving and driven shaft-sections, clutch mechanism for connecting the second named driving and driven shaft-sections, a pair of gears serving to transmit rotation from one driving shaft-section to the other, a gear carried by one driven shaft-section, and a gear splined upon the other driven shaft-section and movable into and out of engagement with said gear.

10. In transmission gearing of the character described, a main shaft, comprising driving and driven shaft-sections, clutch mechanism for connecting the driving and driven shaft-sections, a second shaft comprising driving and driven shaft-sections, clutch mechanism for connecting the second named driving and driven shaft-sections, speed changing gearing connecting the driving shaft-sections, a gear mounted upon one driven shaft-section, a second gear splined upon the other driven shaft-section and adapted to engage and disengage the first named gear, a third gear rigidly mounted upon one driven shaft-section, an intermediate gear engaging the third gear, and a reverse gear splined upon the other driven shaft-section and movable into and out of engagement with the intermediate gear.

In testimony whereof I affix my signature in presence of two witnesses.

CHARLES R. SCOTT.

Witnesses:
JOHN W. CHANDLER,
C. N. LEMON.